United States Patent
Fang et al.

(10) Patent No.: US 7,979,734 B2
(45) Date of Patent: Jul. 12, 2011

(54) METHOD AND SYSTEM FOR PREVENTING SERVICE DISRUPTION OF INTERNET PROTOCOL (IP) BASED SERVICES DUE TO DOMAIN NAME RESOLUTION FAILURES

(75) Inventors: Scott Fang, Richardson, TX (US); Nhut Nguyen, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 356 days.

(21) Appl. No.: 11/776,325

(22) Filed: Jul. 11, 2007

(65) Prior Publication Data

US 2009/0019181 A1    Jan. 15, 2009

(51) Int. Cl.
*G06F 11/00* (2006.01)

(52) U.S. Cl. ............................ 714/4; 714/25; 714/47

(58) Field of Classification Search .......... 714/4, 39, 714/25, 47; 709/217, 219; 370/352, 395.52, 370/241

See application file for complete search history.

(56) References Cited

U.S. PATENT DOCUMENTS

| | | | |
|---|---|---|---|
| 6,487,678 B1 * | 11/2002 | Briskey et al. | 714/4 |
| 6,553,413 B1 * | 4/2003 | Leighton et al. | 709/219 |
| 7,181,653 B2 * | 2/2007 | Challener et al. | 714/39 |
| 7,587,624 B1 * | 9/2009 | Weber | 714/4 |
| 2006/0031393 A1 * | 2/2006 | Cooney et al. | 709/217 |
| 2006/0039352 A1 * | 2/2006 | Karstens | 370/352 |
| 2006/0176822 A1 * | 8/2006 | Doyle et al. | 370/241 |
| 2007/0041386 A1 * | 2/2007 | Mar et al. | 370/395.52 |

* cited by examiner

*Primary Examiner* — Scott T Baderman
*Assistant Examiner* — Sarai Butler

(57) ABSTRACT

A method for preventing service disruption for a device in a network is provided. The method includes populating a filter list with an IP address declared to be valid for a server in the network and populating a rainy day list with an IP address discovered to be valid for the server. The method also includes requesting a DNS server to resolve a server domain name to a server IP address. When no response to the request is received, an IP address on the rainy day list is used to attempt to contact the server. When a response is received, the received IP address is compared to an IP address on the filter list or the rainy day list. When the received IP address matches an IP addresses on the filter list or the rainy day list, the received IP address is used to contact the server.

20 Claims, 2 Drawing Sheets

METHOD AND SYSTEM FOR PREVENTING SERVICE DISRUPTION OF INTERNET PROTOCOL (IP) BASED SERVICES DUE TO DOMAIN NAME RESOLUTION FAILURES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Servers and other devices in a computing network are typically identified by a numeric Internet Protocol (IP) address that might change over time and by a text-based domain name that might remain the same. The Domain Name System (DNS) is a system for mapping the text-based domain name for a web server or other computing device to the device's current numeric IP address. A DNS server or similar device can accept a domain name and provide the IP address that is currently associated with the name. A computer user wishing to connect to a particular server, such as a web server, can enter the domain name associated with the web server into a web browser. The domain name is then sent to a DNS server, which returns the IP address associated with that domain name to the browser. The browser can then use the IP address to connect to the web server. Similarly, the DNS might allow an automated computing device wishing to connect to another device to specify only the domain name of the other device rather than the IP address of the other device.

Several types of errors might prevent a request for a conversion from a domain name to an IP address from occurring successfully. In one type of error, the resolution of a domain name to an IP address may not take place due to the unavailability of a DNS server. The DNS server unavailability may be due to, for instance, a connection problem between the DNS server and a client, a hardware or software problem within the DNS server, or a denial of service attack on the DNS server. In another type of error, a DNS server may be available but may provide incorrect information. An invalid IP address might be returned from a DNS server when, for instance, a software error occurs in the DNS server, the DNS server is incorrectly configured, or invalid IP addresses have been inadvertently or maliciously entered into the DNS server in place of valid IP addresses.

SUMMARY

In one embodiment, a method for preventing disruption of a service for a device in a network due to a domain name resolution failure is provided. The method includes populating a filter list with at least one Internet Protocol (IP) address declared to be valid for a server in the network. The method also includes populating a rainy day list with at least one IP address discovered to be valid for the server. The method also includes requesting a Domain Name System (DNS) server to resolve a domain name associated with the server to a server IP address. The method also includes, upon not receiving a response to the request from the DNS server, using at least one of the IP addresses on the rainy day list to attempt to contact the server. The method also includes, upon receiving a response to the request from the DNS server, comparing a received IP address to at least one of the IP addresses on at least one of the filter list and the rainy day list, and when the received IP address matches at least one of the IP addresses on at least one of the filter list and the rainy day list, using the received IP address to contact the server.

In another embodiment, a system for preventing disruption of a service for a device in a network due to a domain name resolution failure is provided. The system includes a filter list in the device and a rainy day list in the device. The filter list is populated with at least one Internet Protocol (IP) address declared to be valid for a server in the network. The rainy day list is populated with at least one IP address discovered to be valid for the server. When the device requests a Domain Name System (DNS) server to resolve a domain name associated with the server to a server IP address and when the device does not receive a response from the DNS server, the device uses at least one of the IP addresses on the rainy day list to attempt to contact the server. When the device requests the DNS server to resolve the domain name to the server IP address and when the device receives a response IP address from the DNS server, the device compares the response IP address to at least one of the IP addresses on at least one of the filter list and the rainy day list, and when the response IP address matches at least one of the IP addresses on at least one of the filter list and the rainy day list, the device uses the response IP address to contact the server.

In another embodiment, a system for accessing a service accessible via a server in a network is provided. The system includes receiving a request for the service, requesting a Domain Name System (DNS) server to resolve a domain name associated with the server to a server Internet Protocol (IP) address, and using a first list and a second list including IP addresses to verify the authenticity of the server IP address.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and/or methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Embodiments of the present disclosure can prevent service disruptions caused by a DNS server's failure to resolve a domain name to an IP address. Disruptions related to a DNS server being unavailable or to a DNS server providing incorrect information can be prevented. In an embodiment, a device in a computing network can maintain two lists, which can be referred to as the filter list and the rainy day list. The filter list is downloaded to the device and lists one or more IP addresses that are known to be valid IP addresses of one or more legitimate servers or other network components to which the device can be allowed access. The rainy day list is a list of IP addresses of servers or other network components that the device has contacted previously and that were found by the device to be legitimate. Use of the filter list and the rainy day list can allow a device to retrieve an IP address when a DNS server is unavailable and can prevent a device from using an invalid IP address.

In an embodiment, the filter list and the rainy day list may be used in a controlled service offering environment, rather than in an open environment such as the World Wide Web. That is, the filter list and the rainy day list may be used in networks where one or more entities that are in control of the networks are aware of the identities of the devices that might connect to servers in the network and are aware of the IP addresses of the servers to which the devices might connect. For example, a telecommunications company might distribute devices to its customers that allow the customers to access services provided by application servers managed by the telecommunications company. The devices might contact one or more DNS servers controlled by the telecommunications company to retrieve the IP addresses of the application servers. Since the devices, the application servers, and the DNS servers would all be known to and under the control of the telecommunications company, such a group of components could comprise a controlled environment in which the filter list and the rainy day list could be used. In other embodiments, the DNS servers may not be under the control of the telecommunications company.

Figure 1:
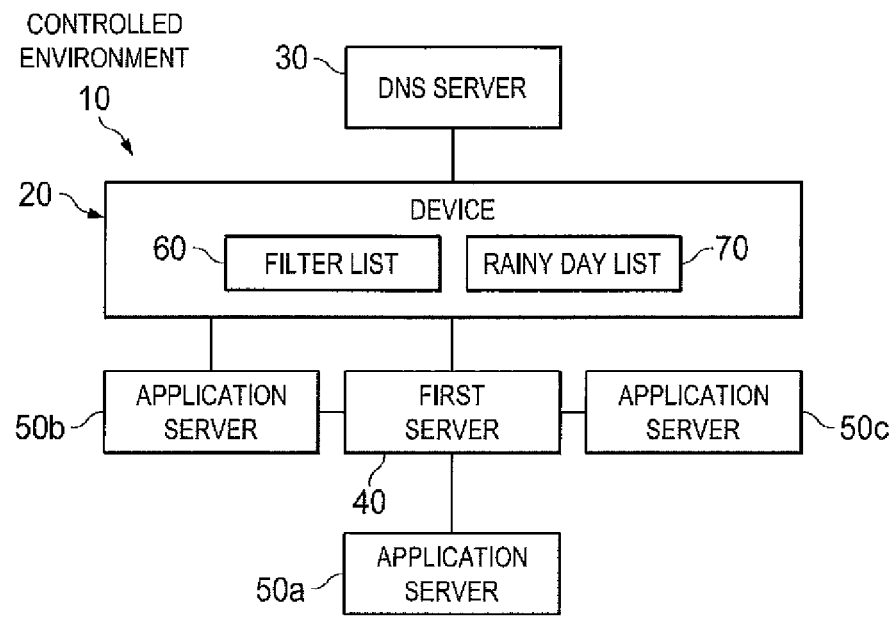
FIG. 1 is a diagram of a controlled service offering environment according to an embodiment of the disclosure.

FIG. 1 illustrates an embodiment of such a controlled environment 10. A device 20 can communicate with a DNS server 30 and a first server 40. The device 20 might be a home gateway that facilitates Internet connections, a device to facilitate connections with a telecommunications network, or a similar device. The DNS server 30 might be publicly accessible or might be privately managed by the same entity that manages the device 20 or by a different entity. The first server 40 can act as a security gateway, a configuration server, a front gate server, an application server, or a similar component that can allow access to a plurality of application servers 50 or other servers or components that can provide services to the device 20. The components that are referred to herein as the application servers 50 should be understood to be capable of performing functions other than merely executing applications. For example, the application servers 50 might be soft switches or media gateways. While only one first server 40 is shown in FIG. 1, in other embodiments, a plurality of first servers 40 might be present, each of which might allow access to a plurality of application servers 50.

When the device 20 wishes to gain access to a service provided by one of the application servers 50, the device 20 might send the domain name of the first server 40 to the DNS server 30. The DNS server 30 might then return the IP address of the first server 40 to the device 20 and the device 20 might use this IP address to contact the first server 40. The first server 40 might then send the device 20 the IP address of the application server 50, such as application server 50b, that provides the desired service. The device 20 might then directly contact application server 50b to gain access to the service. Alternatively, the first server 40 might act as a gateway to the application servers 50 such that all communication between the device 20 and the application servers 50 passes through the first server 40.

As mentioned previously, two types of problems might arise when the device 20 attempts to resolve the domain name of the first server 40 to the IP address of the first server 40. In one category of problem, the DNS server 30 is unable to return an IP address to the device 20. This inability may be due to a lack of a communication channel between the device 20 and the DNS server 30, a failure within the DNS server 30 that prevents the DNS server 30 from responding to the request for an IP address, or some other problem that prevents the DNS server 30 from sending any information to the device 20.

In the other category of problem, the DNS server 30 is able to return an IP address to the device 20, but the IP address is invalid. An invalid IP address might be returned when hardware or software errors occur in the DNS server 30, when the DNS server 30 is configured incorrectly, when the DNS server's map of domain names to IP addresses contains incorrect information, or for other reasons. The map of domain names to IP addresses might be incorrect due to an inadvertent entry of an invalid IP address or to a malicious substitution of a valid IP address with an invalid IP address.

In an embodiment, the device 20 includes a filter list 60 and a rainy day list 70 that can prevent disruptions in the communication between the device 20 and the first server 40 due to either of these types of problems. In other embodiments, the filter list 60 and the rainy day list 70 might reside on some other component to which the device 20 has access. The filter list 60 can contain one or more individual valid IP addresses, one or more ranges of valid IP addresses, and/or one or more subnet addresses for the first server 40. The filter list 60 could be populated with the valid IP addresses or subnet addresses by the entity that manages the controlled environment 10, such as a telecommunications network, after the device 20 first successfully connects to the first server 40.

The rainy day list 70 is a list of IP addresses of servers, such as the first server 40, that the device 20 has contacted previously and that were found by the device 20 to be legitimate servers. A server can be deemed legitimate when a requested service is successfully received from that server or when other criteria are met as appropriate for the server and/or for the service requested.

In an embodiment, the domain name of the first server 40 is preprogrammed into the device 20. Since the IP address of the first server 40 might change over time but its domain name might be less variable, it is typically desirable to have the domain name, rather than the IP address, of the first server 40 preprogrammed into the device 20. When the device 20 is first placed into use, the device 20 attempts to contact the DNS server 30 in order to resolve the preprogrammed domain name into the IP address of the first server 40. During this initial startup process, it can be assumed that the DNS server 30 is able to receive the preprogrammed domain name from the device 20, resolve the preprogrammed domain name into a valid IP address for the first server 40, and return the valid IP address to the device 20. The device 20 can then make an initial contact with the first server 40 at the IP address provided by the DNS server 30.

Prior to the deployment of the device 20, both the filter list 60 and the rainy day list 70 might be empty. When the device 20 is initially started and receives the IP address that the DNS server 30 resolved from the preprogrammed domain name, this IP address can be added to the rainy day list 70. When the initial contact is made between the device 20 and the first server 40, the first server 40 or one of the application servers 50 can download to the device 20 a list of one or more IP addresses and/or one or more subnet addresses with which the filter list 60 can be populated. This list of addresses can be generated by the entity that manages the controlled environment 10 and can include addresses that the entity knows to be valid for one or more first servers 40 that the entity knows to be legitimate. Since this entity might change the IP address of the first server 40 over time, the list of valid addresses provided to the device 20 might be a range of IP addresses and/or one or more subnet addresses that are likely to be used for the first server 40 rather than a single IP address that is currently being used for the first server 40.

If the device 20 wished to establish contact with the first server 40 again at a later time, the filter list 60 and the rainy day list 70 could be used to increase the likelihood of the device 20 having a valid IP address with which to attempt the contact. That is, upon subsequent attempts to contact the first server 40, the device 20 would again send the preprogrammed domain name to the DNS server 30 for resolution to an IP address. The filter list 60 and rainy day list 70 could be used to handle the situation where the DNS server 30 does not return an IP address and could also be used to verify the validity of an IP address that is returned.

In the first case, where an IP address is not returned, the device 20 can attempt to establish contact with the first server 40 using the IP addresses on the rainy day list 70. The device 20 can sequentially use the IP addresses on the rainy day list 70 to attempt to contact the first server 40 until contact with the first server 40 is successfully established. If contact with the first server 40 is not successfully established using any of the IP addresses on the rainy day list 70, an error flag can be raised and the attempts to contact the first server 40 can stop.

In the second case, where the DNS server 30 does return an IP address to the device 20, the device 20 can use the filter list 60 and the rainy day list 70 to verify the validity of the IP address. In this case, the device 20 can compare the IP address that is returned from the DNS server 30 to the IP addresses and/or the subnet addresses on the filter list 60. In some cases, a sequential comparison might be made between the IP address returned from the DNS server 30 and one or more individual IP addresses on the filter list 60. In other cases, it may be determined whether the IP address returned from the DNS server 30 lies within a range of IP addresses or a range of subnet addresses on the filter list 60. If a match is found, then the IP address returned from the DNS server 30 is used to contact the first server 40. That IP address can then be added to the top of the rainy day list 70 and any IP addresses that were previously on the rainy day list 70 can move down the list.

If no match is found between the IP address returned from the DNS server 30 and any of the IP addresses or subnet addresses on the filter list 60, then the IP address returned from the DNS server 30 may be assumed to be invalid. The device 20 can then attempt to find a match with the IP addresses on the rainy day list 70 by sequentially comparing the IP addresses on the rainy day list 70 to the IP address returned from the DNS server 30. When a match is found, that IP address is used to contact the first server 40. If a match is not found, an error flag may be raised or some other indication of an error may be generated and no further attempts to use the IP address returned from the DNS server 30 may be made.

Once the device 20 successfully establishes contact with the first server 40, the device 20 can communicate with the application servers 50, either directly or via the first server 40. In an embodiment, the first server 40 provides the device 20 with the IP addresses of the application servers 50. The device 20 then uses these IP addresses to directly contact the application servers 50 and does not need to retrieve the IP addresses from the DNS server 30. The first server 40 can be relied upon to provide the device 20 with valid IP addresses for the application servers 50 since the use of the filter list 60 and the rainy day list 70 established that the first server 40 is likely to be a trusted server. The IP addresses provided by the first server 40 would not need to be compared against the filter list 60 and the rainy day list 70 since these addresses would be known to be valid.

Figure 2:
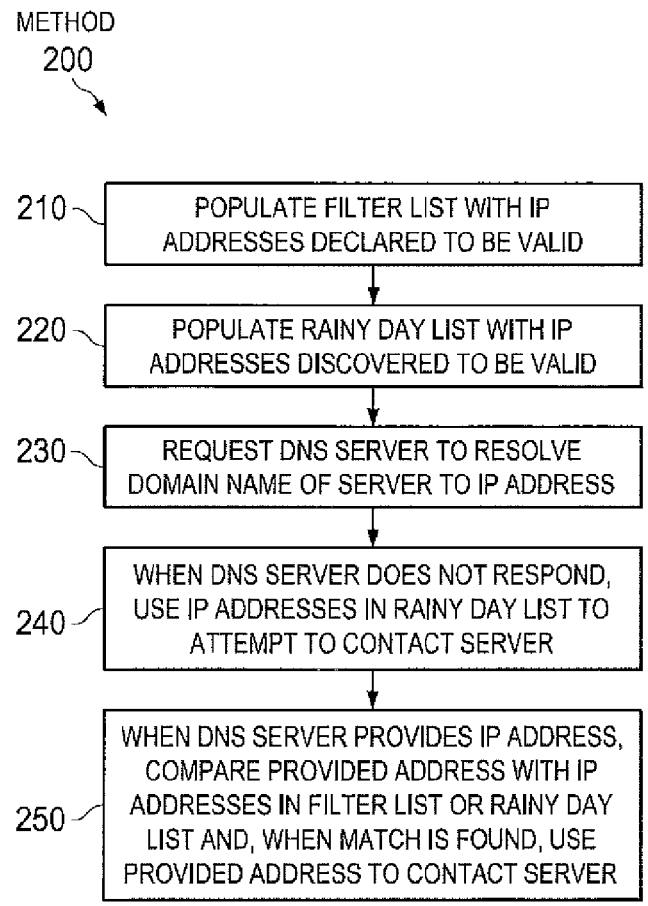
FIG. 2 is a diagram of a method for preventing disruption of a service for a device in a network due to a domain name resolution failure according to an embodiment of the disclosure.

FIG. 2 illustrates an embodiment of a method 200 for preventing disruption of a service for a device in a network due to a domain name resolution failure. In block 210, a filter list in the device (or elsewhere) is populated with IP addresses that have been declared to be valid. The IP addresses might be individual IP addresses, ranges of IP addresses, and/or one or more subnet addresses. An entity that manages the network might provide the device with the list of IP addresses that the entity has declared to be valid. In block 220, a rainy day list in the device (or elsewhere) is populated with IP addresses that have been discovered to be valid. An IP address might be discovered to be valid when the device successfully contacts a server at that IP address. In block 230, the device requests a DNS server to resolve a domain name for the server into an IP address. The domain name might be preprogrammed into the device. In block 240, when the DNS server does not respond, the device uses IP addresses in the rainy day list to attempt to contact the server. In block 250, when the DNS server provides an IP address, the device compares the provided IP address with IP addresses in the filter list or the rainy day list. IP addresses in the filter list might be compared first and if no matches are found, IP addresses in the rainy day list might be compared. When a match is found, the device uses the provided IP address to attempt to contact the server.

Figure 3:
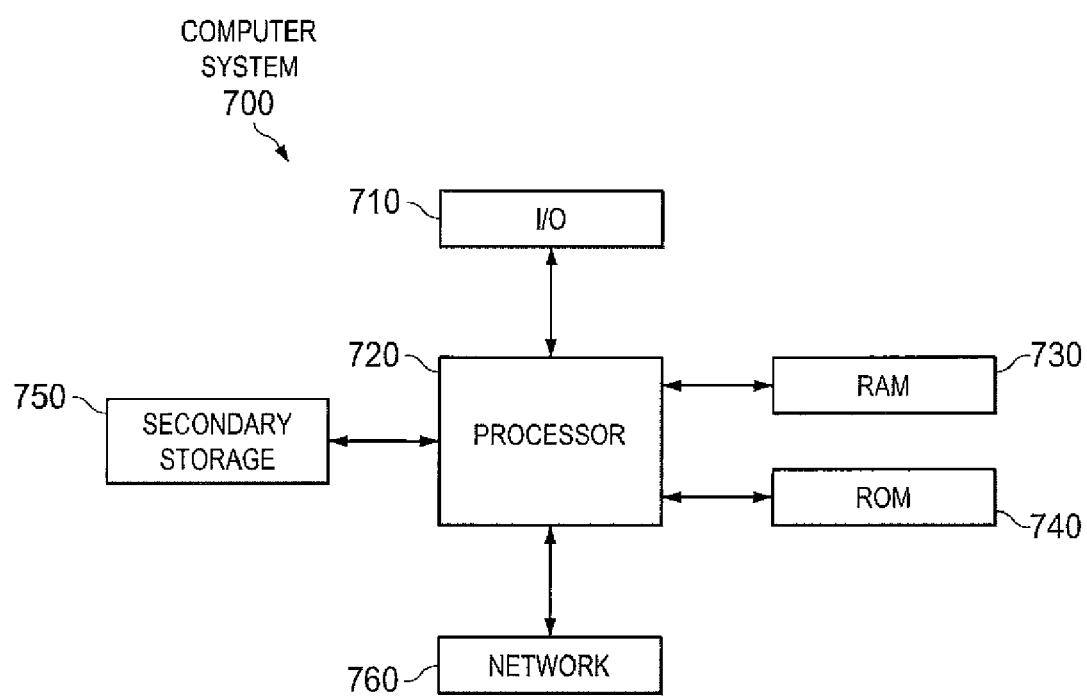
FIG. 3 is an illustrative general purpose computer system suitable for some of the various embodiments of the disclosure.

The device 20 may include any general-purpose or special-purpose computer with sufficient processing power, memory resources, and network throughput capability to handle the necessary workload placed upon it. FIG. 3 illustrates a typical, general-purpose computer system 700 that may be suitable for implementing one or more embodiments disclosed herein. Similar components and functions might also be applicable to a suitable special-purpose computer. The computer system 700 includes a processor 720 (which may be referred to as a central processor unit or CPU) that is in communication with memory devices including secondary storage 750, read only memory (ROM) 740, random access memory (RAM) 730, input/output (I/O) devices 710, and network connectivity devices 760. The processor may be implemented as one or more CPU chips.

The secondary storage 750 is typically comprised of one or more disk drives or tape drives and is used for non-volatile storage of data and as an over-flow data storage device if RAM 730 is not large enough to hold all working data. Secondary storage 750 may be used to store programs which are loaded into RAM 730 when such programs are selected for execution. The ROM 740 is used to store instructions and perhaps data which are read during program execution. ROM 740 is a non-volatile memory device which typically has a small memory capacity relative to the larger memory capacity of secondary storage. The RAM 730 is used to store volatile data and perhaps to store instructions. Access to both ROM 740 and RAM 730 is typically faster than to secondary storage 750.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 760 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 760 devices may enable the processor 720 to communicate with an Internet or one or more intranets. With such a network connection, it is contemplated that the processor 720 might receive information from the network, or might output information to the network in the course of performing the above-described method steps. Such information, which is often represented as a sequence of instructions to be executed using processor 720, may be received from and outputted to the network, for example, in the form of a computer data signal embodied in a carrier wave.

Such information, which may include data or instructions to be executed using processor 720 for example, may be received from and outputted to the network, for example, in the form of a computer data baseband signal or signal embodied in a carrier wave. The baseband signal or signal embodied in the carrier wave generated by the network connectivity 760 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 720 executes instructions, codes, computer programs, scripts which it accesses from hard disk, floppy disk, optical disk (these various disk based systems may all be considered secondary storage 750), ROM 740, RAM 730, or the network connectivity devices 760.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for preventing disruption of a service for a device in a network due to a domain name resolution failure, comprising:
    sending a request to a Domain Name System (DNS) server to resolve a requested domain name associated with a requested server to a resolved server IP address;
    in response to not receiving the resolved server IP address from the DNS server, attempting to contact the requested server by using at least one of the confirmed IP addresses on a rainy day list, the rainy day list comprising at least one confirmed IP address previously used by the device to successfully contact the requested server;
    in response to receiving the resolved server IP address from the DNS server, comparing the resolved IP address to at least one of the confirmed IP addresses on the rainy day list if the resolved IP address does not match any of the valid IP addresses in a filter list, the filter list comprising at least one valid Internet Protocol (IP) address declared to be valid for a server; and
    in response to the resolved server IP address not matching any of the IP addresses in the filter list and the rainy day list, ceasing attempts to contact the requested server, wherein the filter list and the rainy day list are independent from the DNS server.

2. The method of claim 1, further comprising populating the filter list during initialization of the device, wherein populating the filter list comprises:
    upon initialization of the device, requesting the DNS server to resolve a predetermined domain name of a first server;
    contacting the first server using a first server IP address received from the DNS server;
    receiving from the first server at least one valid IP address; and
    populating the filter list with the received valid IP addresses.

3. The method of claim 1, wherein each of the at least one valid IP address is specified by an entity that manages the network to be a legitimate IP address that is associated with a domain name for a corresponding server.

4. The method of claim 1, further comprising:
    when the resolved IP address matches at least one of the IP addresses on at least one of the filter list and the rainy day list, using the resolved IP address to contact the server;
    upon successfully contacting the requested server, placing the resolved IP address used to contact the requested server in a first position in the rainy day list; and
    when a different IP address for the requested server is already present at the first position in the rainy day list, moving the different IP address already present in the rainy day list to a next lower position in the rainy day list.

5. The method of claim 1, wherein using at least one of the confirmed IP addresses on the rainy day list to attempt to contact the requested server comprises:
    using a first confirmed IP address on the rainy day list to attempt to contact the requested server;
    when an attempt to use the first confirmed IP address on the rainy day list is unsuccessful, continuing to attempt to contact the server using subsequent confirmed IP addresses for the requested server on the rainy day list sequentially; and when none of the attempts using the confirmed IP addresses on the rainy day list is successful, generating an indication of an error.

6. The method of claim 1, further comprising when the resolved IP address does not match any of the IP addresses in the filter list and the rainy day list, generating an indication of an error.

7. The method of claim wherein determining whether the resolved IP address is present on the filter list comprises at least one of:
   comparing the resolved IP address to at least one valid IP address on the filter list;
   comparing the resolved IP address to at least one valid subnet address on the filter list;
   determining whether the resolved IP address lies within a range of valid IP addresses on the filter list; and
   determining whether the resolved IP address lies within a range of valid subnet addresses on the filter list.

8. The method of claim 1, further comprising ceasing attempts to contact the requested server if attempts to contact the requested server using the confirmed IP addresses on the rainy day list fail.

9. The method of claim 1 further comprising receiving from the requested server a valid IP address of at least one additional server and using the valid IP address of the at least one additional server to contact the at least one additional server and request the service.

10. The method of claim 1, wherein the device is at least one of
    a device that facilitates an Internet connection; and
    a device that facilitates a connection with a telecommunications network.

11. A system for preventing disruption of a service for a device in a network due to a domain name resolution failure comprising:
    a filter list populated with at least one valid Internet Protocol (IP) address, each of the at least one valid IP address in the filter list declared to be valid for a domain name of a server in the network;
    a rainy day list in the device populated with at least one confirmed IP address, each of the at least one confirmed IP address in the rainy day list discovered by the device to be valid for a domain name of a previously contacted server,
    wherein the device is configured to:
      send a request to a Domain Name System (DNS) server to resolve a requested domain name associated with a requested server to a resolved server IP address,
      in response to not receiving the resolved server IP address from the DNS server, attempt to contact the requested server by using at least one of the confirmed IP addresses on the rainy day list to attempt to contact the requested server,
      in response to receiving the resolved server IP address from the DNS server, compare the resolved IP address to at least one of the confirmed IP addresses on the rainy day list, and
      in response to the resolved server IP address not matching any of the IP addresses in the filter list and the rainy day list, cease attempts to contact the requested server, wherein the filter list and the rainy day list are independent from the DNS server.

12. The system of claim 11, wherein the the device is further configured to:
    request the DNS server to resolve a predetermined domain name of a first server when the device is initially started, contact the first server using a first server IP address received from the DNS server,
    receive from the first server at least one valid IP address declared to be valid, and
    populate the filter list with the valid IP addresses received from the requested server.

13. The system of claim 11, wherein each of the at least one valid IP address is specified by an entity that manages the network to be a legitimate IP address that is associated with a domain name for a corresponding server, and
    wherein the device is further configured to cease attempts to contact the requested server if the attempts to contact the requested server using the confirmed IP addresses on the rainy day list fail.

14. The system of claim 11, wherein the device further configured to:
    when the resolved IP address matches at least one of the IP addresses on at least one of the filter list and the rainy day list, use the resolved IP address to contact the server;
    upon successfully contacting the requested server, place the resolved IP address used to contact the requested server in a first position in the rainy day list, and
    when a different IP address is already present at the first position in the rainy day list, move the different IP address already present in the rainy day list to a subordinate position in the rainy day list.

15. The system of claim 11, wherein the device is further configured to receive from the requested server a valid IP address of at least one additional server and use the valid IP address of the at least one additional server to contact the at least one additional server and request the service.

16. The system of claim 11, wherein the device is at least one of:
    a device that facilitates an Internet connection; and
    a device that facilitates a connection with a telecommunications network.

17. A method for accessing a service accessible via a server in a network, comprising:
    receiving a request for the service;
    sending a request to a Domain Name System (DNS) server to resolve a requested domain name to a resolved server Internet Protocol (IP) address, the requested domain name being associated with a requested server that provides access to the service;
    upon receiving the resolved server IP address from the DNS server, verifying the authenticity of the resolved server IP address using a second list including server IP addresses if the resolved IP address does not match any, of the valid IP addresses in a first list; and
    in response to the resolved server IP address not matching any of the IP addresses in the first list and the second list, ceasing attempts to contact the requested server, wherein the first list and the second list are independent from the DNS server,
    wherein the first list comprises at least one valid Internet Protocol (IP) address, each of the at least one valid IP address in the first list declared to be valid for a domain name of a server in the network, and
    wherein the second list comprises at least one confirmed IP address, each of the at least one confirmed IP address in the second list discovered by the device to be valid for a domain name of a previously contacted server.

18. The method of claim 17 further comprising, wherein each of the at least one valid IP address is specified by an entity that manages the network to be a legitimate IP address that is associated with a domain name for a corresponding server.

19. The method of claim 17, further comprising:
when the resolved server IP address is not received from the DNS server, attempting to contact the requested server by using at least one of the confirmed server IP addresses on the second list; and
ceasing attempts to contact the requested server if attempts to contact the requested server using the confirmed IP addresses on the rainy day list fail.

20. The method of claim 17, further comprising:
when the resolved IP address matches at least one of the IP addresses on at least one of the filter list and the rainy day list, using the resolved IP address to contact the server;
upon successfully contacting the requested server, placing the resolved IP address used to contact the requested server in a first position in the rainy day list; and
when a different IP address for the requested server is already present at the first position in the rainy day list, moving the different IP address already present in the rainy day list to a next lower position in the rainy day list.

\* \* \* \* \*